(12) United States Patent
Yang et al.

(10) Patent No.: US 11,091,847 B2
(45) Date of Patent: Aug. 17, 2021

(54) METHOD OF MANUFACTURING AIRCRAFT ENGINE PARTS UTILIZING REUSABLE AND RECONFIGURABLE SMART MEMORY POLYMER MANDREL

(71) Applicant: Unison Industries LLC, Jacksonville, FL (US)

(72) Inventors: Yanzhe Yang, Beavercreek, OH (US); Michael Thomas Kenworthy, Beavercreek, OH (US); Tajiri Gordon, Dayton, OH (US)

(73) Assignee: Unison Industries LLC, Jacksonville, FL (US)

( * ) Notice: Subject to any disclaimer, the term of this patent is extended or adjusted under 35 U.S.C. 154(b) by 271 days.

(21) Appl. No.: 15/337,931

(22) Filed: Oct. 28, 2016

(65) Prior Publication Data

US 2018/0119300 A1    May 3, 2018

(51) Int. Cl.

| | |
|---|---|
| *C25D 1/02* | (2006.01) |
| *B29D 23/00* | (2006.01) |
| *B29C 33/76* | (2006.01) |
| *C25D 1/20* | (2006.01) |
| *B29C 33/38* | (2006.01) |
| *B29C 33/40* | (2006.01) |

(Continued)

(52) U.S. Cl.
CPC ............ *C25D 1/02* (2013.01); *B29C 33/3842* (2013.01); *B29C 33/40* (2013.01); *B29C 33/76* (2013.01); *B29C 35/02* (2013.01); *B29C 37/0067* (2013.01); *B29C 70/30* (2013.01); *B29D 23/003* (2013.01); *C25D 1/20* (2013.01); *B29K 2105/0827* (2013.01); *B29K 2105/0845* (2013.01); *B29K 2307/04* (2013.01); *B29L 2023/22* (2013.01); *B29L 2031/3076* (2013.01); *B29L 2031/757* (2013.01)

(58) Field of Classification Search
None
See application file for complete search history.

(56) References Cited

U.S. PATENT DOCUMENTS

| | | | | |
|---|---|---|---|---|
| 3,850,769 | A | * | 11/1974 | Diepers .................... C25D 3/26 204/212 |
| 5,109,589 | A | * | 5/1992 | Cramer .................... C25D 1/10 29/527.4 |

(Continued)

FOREIGN PATENT DOCUMENTS

| | | | | |
|---|---|---|---|---|
| JP | 02-185991 | * | 7/1990 | ............... C25D 1/02 |
| JP | 04080389 | * | 3/1992 | ............... C25D 1/02 |

(Continued)

OTHER PUBLICATIONS

Partial European Search Report and Opinion issued in connection with corresponding EP Application No. 17198642.5 dated May 29, 2018.

(Continued)

*Primary Examiner* — Stefanie S Wittenberg
(74) *Attorney, Agent, or Firm* — McGarry Bair PC (57) ABSTRACT

A manufacturing process for making aircraft engine parts utilizes reusable reconfigurable smart memory polymer mandrel tooling, low temperature metal deposition, and composite part lay-up with resin coated conformable braided carbon fiber sleeves, to fabricate both metal internal engine parts and non-metal external parts for turbine engines.

18 Claims, 8 Drawing Sheets

(51) Int. Cl.
*B29C 35/02* (2006.01)
*B29C 37/00* (2006.01)
*B29C 70/30* (2006.01)
B29K 105/08 (2006.01)
B29K 307/04 (2006.01)
B29L 23/00 (2006.01)
B29L 31/30 (2006.01)
B29L 31/00 (2006.01)

(56) References Cited

U.S. PATENT DOCUMENTS

| | | |
|---|---|---|
| 7,422,714 B1 | 9/2008 | Hood et al. |
| 8,945,455 B2 | 2/2015 | Everhart et al. |
| 2006/0130940 A1* | 6/2006 | Kollaritsch ......... B21D 22/022 |
| | | 148/518 |
| 2010/0018953 A1 | 1/2010 | Shapovalov et al. |
| 2012/0118487 A1 | 5/2012 | Havens et al. |
| 2012/0216997 A1* | 8/2012 | Suwa ................. C25D 3/02 |
| | | 165/185 |
| 2014/0272121 A1 | 9/2014 | Ng et al. |

FOREIGN PATENT DOCUMENTS

| | | | |
|---|---|---|---|
| JP | 04-157195 | * 5/1992 | ............... C25D 1/02 |
| KR | 20100138625 | * 12/2010 | ............... C25D 1/00 |
| RU | 2231235 | * 6/2004 | ............... H05H 7/20 |

OTHER PUBLICATIONS

Extended European Search Report and Opinion issued in connection with corresponding EP Application No. 17198642.5 dated Aug. 30, 2018.

* cited by examiner

METHOD OF MANUFACTURING AIRCRAFT ENGINE PARTS UTILIZING REUSABLE AND RECONFIGURABLE SMART MEMORY POLYMER MANDREL

I. FIELD OF THE INVENTION

The present invention relates generally to duct manufacturing processes. More particularly, the present disclosure relates to fabrication of metal and non-metal parts for aircraft engines.

II. BACKGROUND OF THE INVENTION

In modern aircraft engines, various tubes and ducts which are used to deliver a variety of fluids (e.g., air, oils, fuels, etc.) are generally known as fluid delivery systems. These tubes and ducts can have complex geometry in three dimensional (3-D) space. For example, the ducts can have: multiple bends, cylindrical and non-cylindrical geometries, non-uniform cross-sectional size (tapering) and other variable cross sections along an axial direction, and complex transitions from cylindrical to rectangular cross-sectional shapes. Such designs bring manufacturing challenges and problems.

Solutions for fabricating metal parts, for example, often involve a series of operations of bending, stamping, forming, welding, and/or brazing. In addition, the sub-components may have to be made thicker than required to compensate for thermal deformation introduced by the joining process. Moreover, if a design change is made, a new set of tooling is needed. For a final tube or duct assembly, a number of sub-components may be joined together by fusion welding or brazing.

Solutions for fabricating non-metal parts, for example, often use a rigid cure tool/mandrel. Removal of such a mandrel from the duct or cured part, however, can be difficult, costly, and time consuming. This is especially so if the duct, or formed part, has a complex geometry (such as those often found in aircraft engine parts) which precludes easy removal of the part from the rigid mandrel.

Other known manufacturing processes use a segmented mandrel which can be removed and disassembled in sections, after the formed part has been cured into a rigid state. These types of mandrels, however, can be expensive and time consuming to install and remove. Moreover, such segmented mandrels are often designed to make a single specific part, and are not easily reconfigured to form other different types of parts.

Still other known methods of removing the mandrel involve sacrificing the mandrel by cutting, dissolving or otherwise breaking the mandrel down into more easily removable pieces. For example, Hammer et al, published Patent Application No. US2014/0023812A1, teaches removing a mandrel, used for making aircraft fluid delivery pipes, by dissolving the mandrel in acid. Such destructive methods typically not only prevent reuse of the mandrel, but may also result in damage to the duct or formed part itself. Moreover, use of expendable tools can involve not only recurring tooling costs but additional cost for piece work part processing as well.

Still other known production processes may use less destructive inflatable/deflatable balloon-like mandrels. These bladder-type tools, however, often suffer from a lack of strength and rigidity, and may require supporting struts or other load support structures, during the part fabrication process. Such collapsible tooling, however, is also complex and cost prohibitive for most designs.

Other conventional techniques include making aircraft engine parts using a substrate, model, mold or mandrel in conjunction with a tooling assembly. A mold, set of molds, or set of pieces to make a mold is sometimes referred to simply as a tool or tooling.

For example, making composite parts using shape memory polymer (SMP) mandrels is a well-known process. See U.S. Pat. No. 7,422,714B1, for a "Method of Using Shape Memory Material For Composite Part Manufacturing", issued to Hood et al, on Sep. 9, 2008; and see Methods and systems for co-bonding or co-curing composite parts using a rigid/malleable SMP apparatus, issued to Havens et al, on Feb. 10, 2015.

SMPs are polymeric materials whose qualities are altered to enable dynamic shape "memory" properties. SMPs derive their name from their inherent ability to return to their original "memorized" shape after undergoing a shape deformation. SMPs (that have been pre-formed) can be deformed to any desired target shape. After deformation, in order to maintain the thermoformed shape (i.e., to "lock" in the deformation), the SMP must remain below, or be quenched to below "Tg". (Tg is the inherent glass transition temperature of the particular type of SMP selected to be utilized for deformation.) The SMP will hold its deformed shape indefinitely until heated above its Tg again; whereat the SMP returns to its pre-formed ("remembered") state. Such SMP properties are known in the art; (see, for example, Hood '714 at column 3).

Although the Hood '714 method employs reusable SMP mandrel, it contemplates that the SMP is in the form of particle, foam or gel, and/or that the SMP is reinforced with fibrous material (such as textile fabric

III. SUMMARY OF EMBODIMENTS OF THE INVENTION

Given the aforementioned deficiencies, a need exists for an improved method for forming engine parts, that does not suffer from the above limitations, solves some of the concomitant problems indicated above, and employs tooling with mold/mandrel materials that enable both reuse and reconfiguration. A need also exists for an alternate method to fabricate tube and duct assemblies for fluid delivery in aircraft engines.

An embodiment of the present invention includes a method using low temperature deposition of metal onto reusable reconfigurable SMP tooling. An embodiment of the present manufacturing method conceptually includes three stages, as discussed in further detail below.

Under certain circumstances, an embodiment of the present invention includes a method for fabricating a target part for fluid delivery using reusable reconfigurable SMP and low temperature metal deposition. The method includes providing a mandrel using SMP having a pre-form shape and a glass transition temperature (Tg), providing a tooling assembly with a shape mold designed in accordance with the target part and placing the pre-form SMP in contact with the shape mold and stimulating the SMP until the SMP deforms to replicate a geometry of the shape mold. The method also includes coating an outer surface of the deformed SMP with a conductive metal and placing a whole tooling into a low temperature electroplating tank, applying voltage to electrochemically deposit metal onto a surface of the tooling, removing the whole tooling from the bath and applying heat thereto, the SMP becoming malleable in response to the heat.

In addition to use in making metal internal aircraft engine parts, another embodiment of the present invention can be used in fabricating non-metal external aircraft engine parts. These parts may be found, for example, on the exterior of turbine engines. Another exemplary embodiment uses SMP mandrels, in conjunction with resin coated woven conformable carbon fiber sleeves, to fabricate the non-metal external parts.

Still other embodiments could be used, for example, not only for low temperature tubes and ducts for some fluid delivery systems, but also to make composite laminate parts for mounting brackets, fan case housings, supports, and other aerospace components.

Many of the shape shifting properties of SMP materials have been known in the art for decades, (e.g., see the above discussed Hood '714 patent, and the other SMP related references cited in those patents). Nevertheless, known processing techniques or methods do not teach the concepts described herein. Known processes certainly do not teach techniques or methods for fabricating aircraft engine parts having complex 3-D tube and duct geometries with transitioning cross-sections, using smart polymer tooling in the novel fashion disclosed and claimed in the present invention.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

V. DETAILED DESCRIPTION OF EMBODIMENTS OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
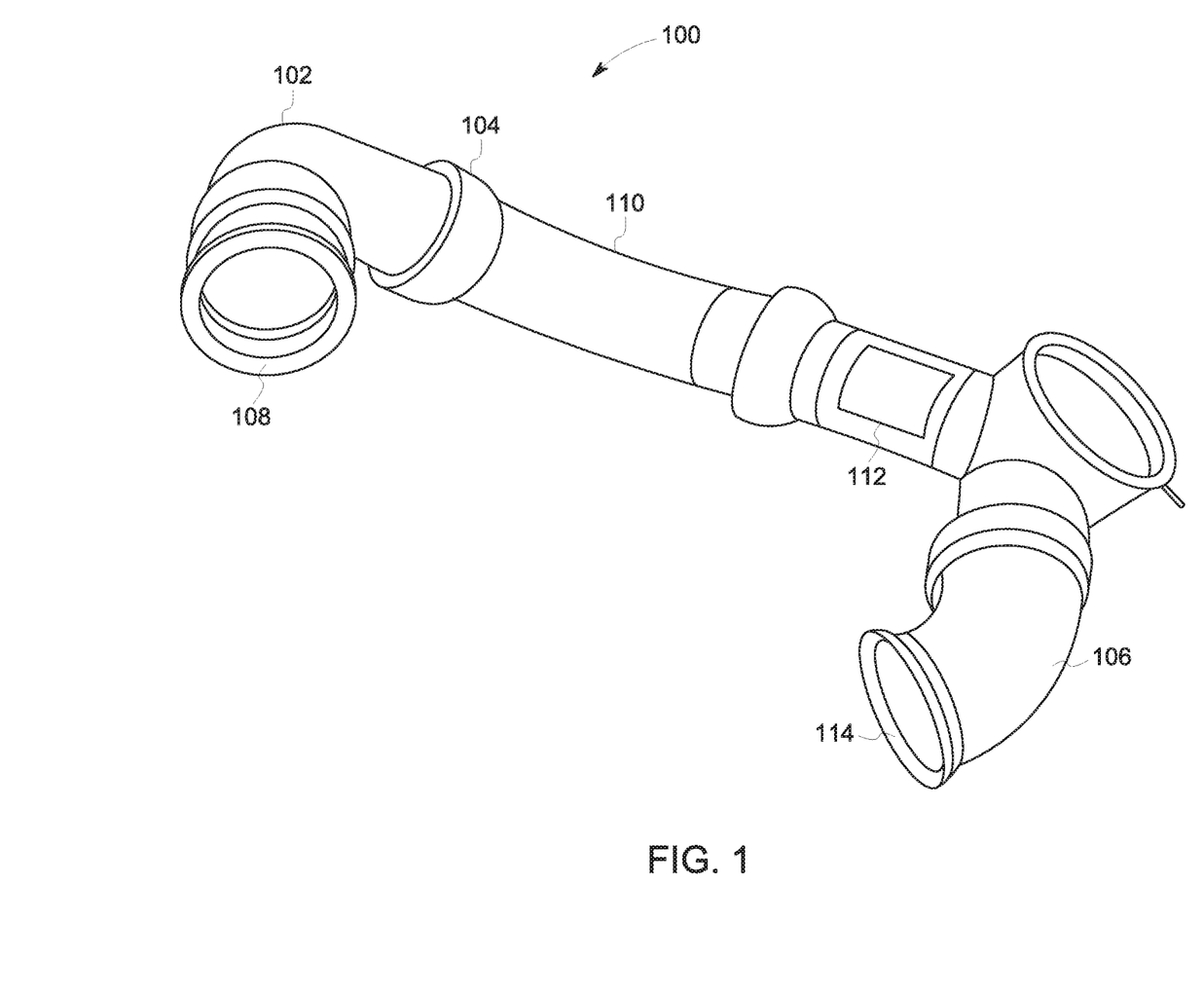
FIG. 1. illustrates an exemplary aircraft engine duct in accordance with various aspects described herein.

FIG. 1 is an illustration of an exemplary aircraft engine duct assembly 100, having various subcomponents, to which embodiments of the present invention may apply. Moreover, as shown in FIG. 1, the duct assembly 100 has complex geometries in 3-D space and includes: multiple bends 102, 106; a flex joint 104; and variable cross sections 108, 110, 112, and 114 along an axial direction. Although the engine part 100 is a duct, the embodiments can be applied to a variety of tubes, assemblies, and aircraft fluid delivery channels, as understood by those of skill in the art.

Figure 2:
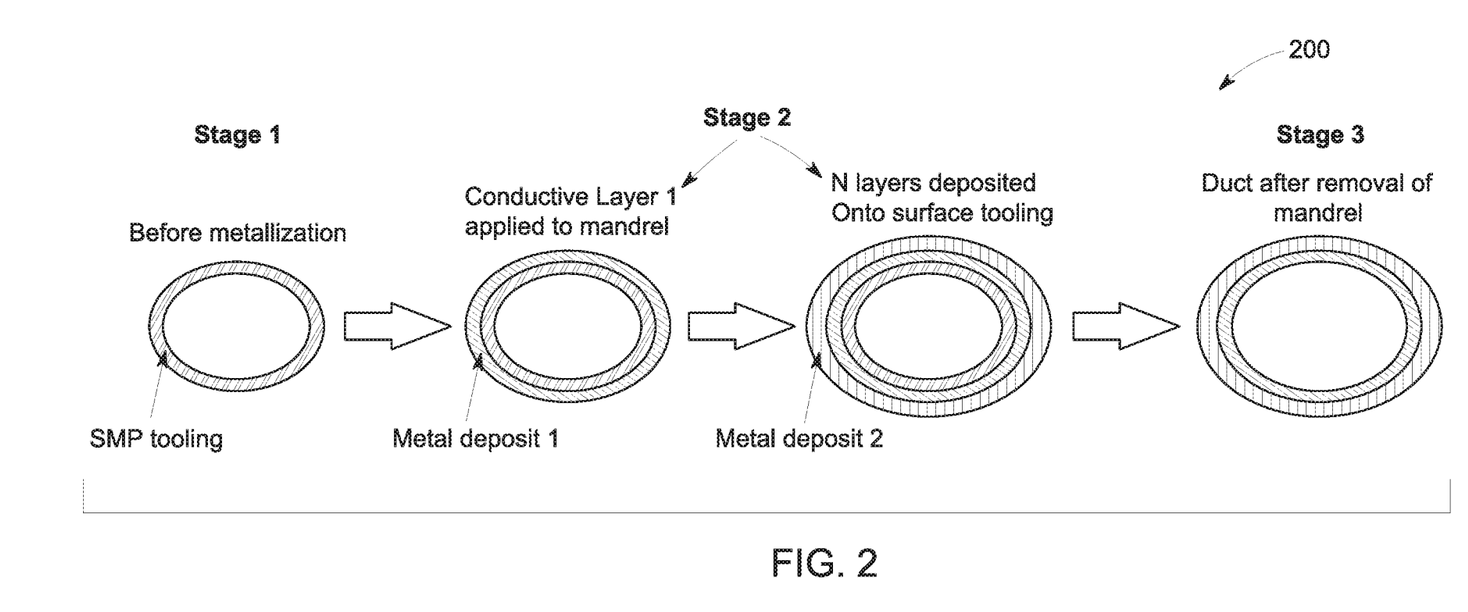
FIG. 2. is a conceptual overview of a manufacturing process, for ducts and tubes, in accordance with an embodiment of the present invention.

FIG. 2 is a high-level overview of a multi-stage process 200 of an exemplary embodiment. Each of the multiple stages of the process 200 are discussed in greater detail below. At a high-level, the process 200 uses low temperature metal depositions, onto an SMP tooling mandrel, to fabricate aircraft engine parts with complex geometries. These engine parts may have complex geometries, such as those discussed above with reference to FIG. 1.

In the multi-stage process 200, before metallization a tooling mandrel, which is part of a tooling assembly, is made of SMP at Stage 1. Under stimuli, the SMP can exhibit a change from a rigid state to a very pliable elastic state. While pliable, the SMP can be triggered into mimicking or conforming to other shapes, without degradation.

At Stage 2, and after the mandrel has replicated or conformed to the desired shape of a target part (hereinafter Part-A), low temperature metal deposition can be used to affix a metal layer to an outer surface of the SMP tooling. The surface of the tooling is then made electrically conductive and the entire tooling assembly is put into an electroplating tank or bath. The metal is electrochemically deposited onto the surface of the tooling with application of appropriate voltage. At Stage 2B, additional metal layers may be deposited, as desired, and/or when necessary.

Once a desired metal deposition is completed, the assembly is heated to a temperature above the glass transition temperature (Tg) of the selected SMP. As a result, at Stage 3, the SMP tooling becomes soft and can be removed and separated from the newly formed Part-A Removal can occur without damage to the tooling or to Part-A. If the stimuli are then removed, the SMP returns to a rigid memory state, and can be used for another part.

In the embodiments, pre-machined flanges can be attached to the mandrel before electroplating. Metal can then be electroformed over a base of the flange and the surface of the mandrel. When the mandrel is removed, Part-A is formed with the flange attached as a subcomponent.

Figure 3:
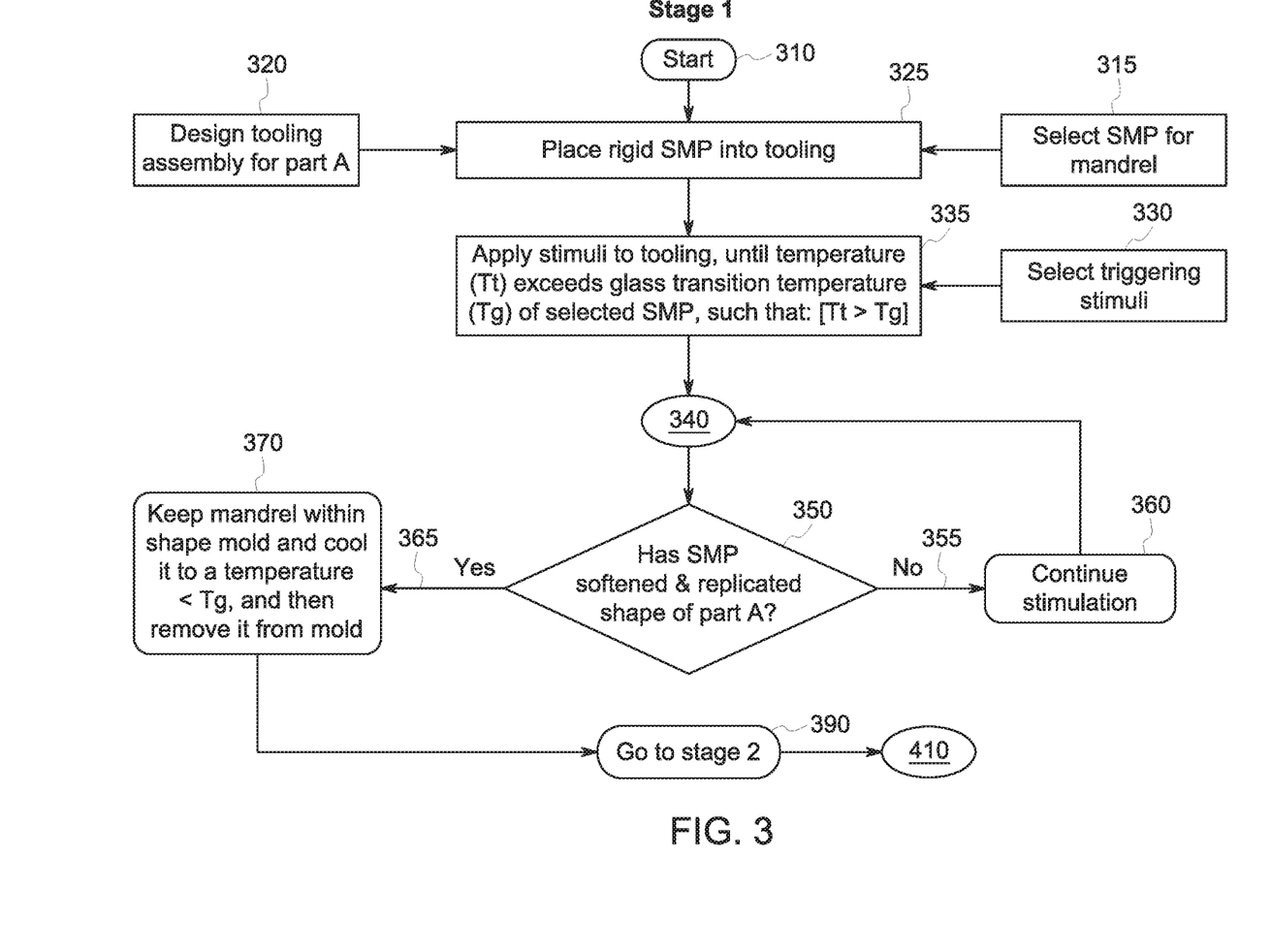
FIG. 3 is a flowchart illustrating steps of an exemplary first stage (i.e., making the mandrel) of the process of FIG. 2, in accordance with the embodiments.
Figure 4:
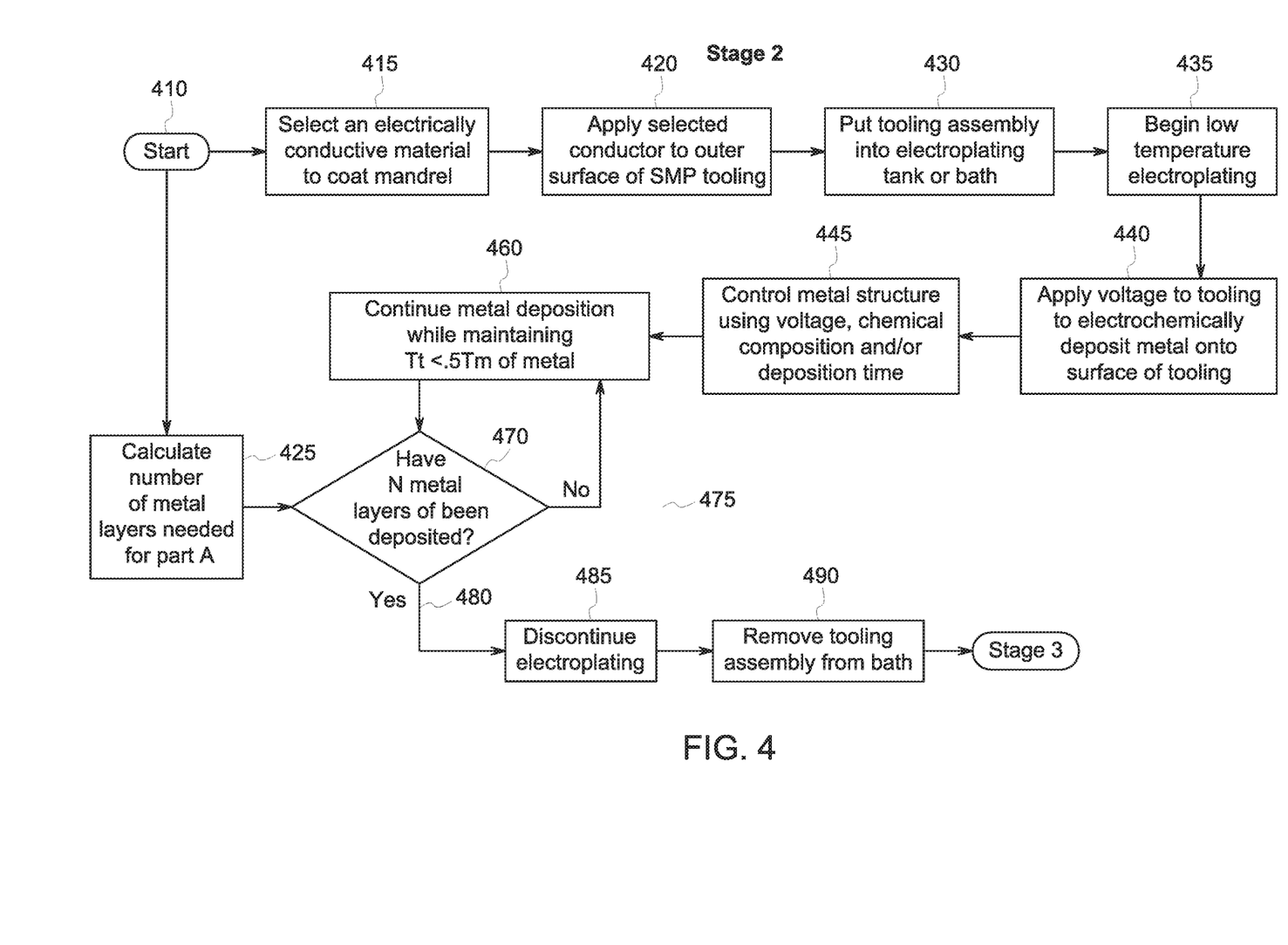
FIG. 4 is a flowchart illustrating steps of an exemplary second stage (i.e., metal deposition) of the process of FIG. 1.
Figure 5:
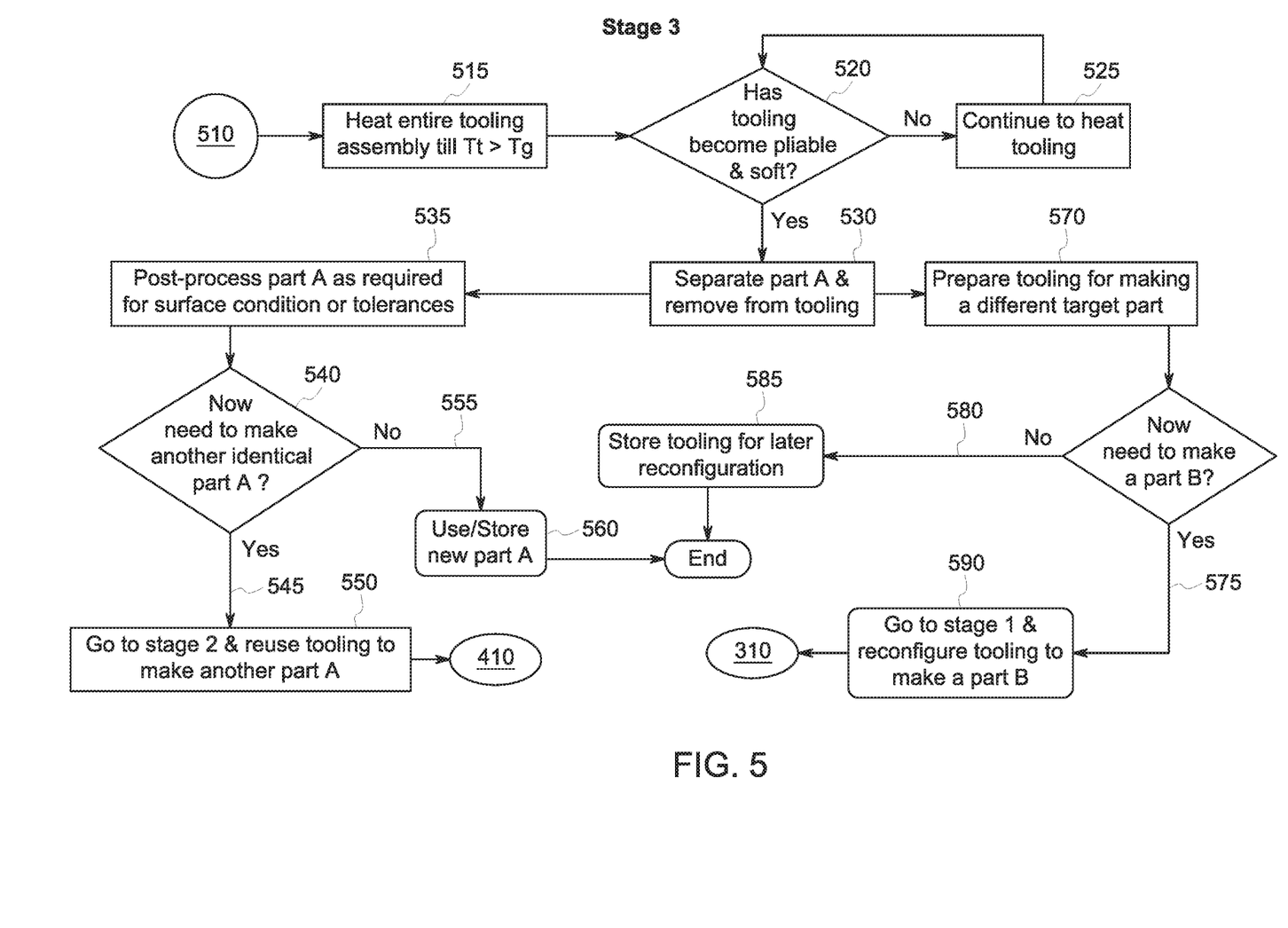
FIG. 5 is a flowchart illustrating steps of an exemplary third stage (i.e., removal and reuse) of the process of FIG. 1.

In the description of FIGS. 3, 4, and 5; Stages 1, 2, and 3 will be discussed in greater detail. In particular, FIG. 3 corresponds to Stage 1, FIG. 4 corresponds to Stage 2, and FIG. 5 corresponds to Stage 3.

Stage 1: Making SMP Mandrel

FIG. 3 is a flowchart illustrating more detailed steps of the Stage 1 (i.e., making the mandrel) of the process of FIG. 2.

In this exemplary method, starting at step 310, a specific type pf SMP is selected or prepared based on chemical, electrical, thermal and other characteristics of particular polymers and the target part in step 315. Numerous types of polymers and alloys, which exhibit shape memory properties, are known by those skilled in the art. For example, see the above cited Hood '714 patent, at Columns 3 and 5; or see Havens '375, at Columns 5 and 6.

The SMP utilized may also be selected or tailored to meet the specific tolerances (e.g., for Part-A) and temperature requirements needed (e.g., for the selected type of electroforming). One requirement, for example for metal parts, is that the SMP utilized, to later form the mandrel, should be selected such that it has a predetermined Tg higher than the temperature of the deposition bath (which is to be used later in the metal embodiments). For both metal and non-metal embodiments, Tg is a major consideration. Cost is another consideration in selecting a particular type of SMP material.

At step 320, a tooling assembly, or tooling, is designed having the desired shape and geometries of a particular aircraft engine fluid delivery channel, duct or tube. The tooling is made for the complex geometry of a target part, such as Part-A, having plural subcomponents.

Prior to contact with the tooling 320, the selected SMP material 315 is typically in a rigid pre-form state. While the embodiment of FIG. 2, for illustrative purposes, indicates an SMP tooling having an annular or cylindrical pre-form geometry, other pre-form memory shapes (such as: spheres and ovals, triangles and pyramids, rectangles and boxes of various shapes and sizes, and other geometric patterns) are within the scope of the present invention.

At step 330, predetermined stimuli, which can later trigger deformation of the selected SMP, are selected and/or calculated. By way of example, depending upon the SMP material selected, the stimuli can be thermal or other stimuli.

At step 325, depending upon the shape of the target part, selected SMP material can be placed onto or inside the mold or tooling assembly. For example, in some embodiments of the invention, a substantially tubular or cylindrical pre-form SMP mandrel is placed inside a clamshell mold or mold cavity of a tooling of the desired shape.

Selected stimuli are applied to the tooling to trigger a state change in the SMP, as indicated in step 335. In some embodiments, the stimulation step could include use of pressurization, vacuum, and/or various heated materials, including air, gas or other fluids, to facilitate raising the temperature of the utilized SMP above the material's Tg. In one embodiment, the mold is put in an oven, which is heated above Tg. While in the oven, the SMP is pressurized by air or another gas.

Stimulation of the SMP tooling continues (steps 340, 350, 355, 360) until the SMP temperature exceeds Tg. In steps 350 and 365, the SMP transforms from a rigid substance into an elastic, flexible, and soft substance. In this soft malleable elastic state, the SMP mimics or replicates the tooling mold shape, and thus defines the desired target geometry of Part-A.

At step 370, the SMP mandrel is kept within the shape mold and cooled to a temperature below its Tg. It is thereafter removed from the mold. The SMP is desirably maintained at low temperature to prevent softening and loss of its geometry accuracy. At step 390, of the Stage 1, the process 200 transitions to Stage 2 for metal deposition.

Stage 2: Depositing Metal

During Stage 2, metals are deposited onto the outer surface of the SMP tooling. Those skilled in the art would recognize that metal deposition on plastic has been demonstrated previously. Nevertheless, this metal deposition desirably occurs in a low temperature process to prevent the tooling will become soft and lose its geometric accuracy. Those skilled in the art would know that the Tg of SMP is typically much higher than most electroplating processes. Therefore, during the deposition steps, the temperature of the tooling (Tt) is kept well below the melting point (Tm) of the metal to be deposited on the mandrel. Preferably, Tt is kept (<0.5 Tm) of the utilized metal. In other words, [Tt<0.5 Tm]. As a result, thermal deformation to the assembly is minimized, and thinner and lighter assembly is possible.

By way of example, and not limitation, various deposition methods used in different embodiments of the present invitation can include electroforming, such as by electroplating. Other deposition methods include kinetic metal deposition (cold spray) or ultrasonic consolidation. In a preferred embodiment, deposition of metal onto plastic-type materials is achieved, at low temperature, using electroplating. In part, this is because the Tg of SMP is typically much higher than the temperature of most electroplating processes.

Common materials for electroforming and electroplating are limited to a few, including copper alloy, nickel alloy, aluminum alloy, titanium alloy and gold. Other common engineering materials (such as stainless steel and titanium) cannot always be electrochemically deposited in the desired fashion. In such cases, a secondary low-temperature metal deposition technique is required, such as kinetic metal deposition (e.g., cold spray) or ultrasonic consolidation. Various metal stocks can be used for multi-material parts.

For example, we can achieve layered copper-nickel material, by electroplating copper to a certain thickness and then electroplating nickel on top of the copper. The benefit of such material is to leverage, for example, the good thermal conductivity of copper, and use the outer layer of nickel as a protective layer.

FIG. 4 illustrates the steps of Stage 2 of the present invention, beginning at method step 410. At step 415, an electrically conductive metallic material is selected and/or prepared. At step 420, the surface of the tooling is made electrically conductive by coating it with the conductive material. This can be achieved by painting, spraying, dip coating, sputtering, electroplating, or other methods. In step 430, the tooling is put into an electroplating bath or tank, and the low temperature electroplating process is started at step 435. As voltage is applied, metal is electrochemically deposited on to the surface of the tooling, at step 440.

Thickness, chemical composition, and/or metallurgical microstructure of the metal can be controlled (step 445) by changing voltage characteristics, chemical composition, or deposition time. Throughout stage 220, [Tt<0.5 Tm] is maintained (step 460), as one or more layers of metal are deposited or applied to the tooling.

As a precursor, the desired number of layers (N) is calculated (425) or set. For example, N may be based on the desired strength or thickness of Part-A, on mechanical or chemical properties of the selected metal, or on other factors. The first layer (N=1) deposited, on the tooling outer surface, has to be electroplated.

On the other hand, after the first layer is electroplated, further layers (N=>2), could be electroplated, cold sprayed, or ultrasonically consolidated. We could, for example, electroplate layer 1 as material A, electroplate layer 2 as material B, electroplate layer 3 as material C, so on and so forth. Alternatively, we could electroplate layer 1 as material A; and then materials B, C, etc. could be layered on by cold spraying or ultrasonic consolidation.

Electroplating continues (steps 470 and 475) until N layers of metal have been deposited, at step 480. Once the desired layers for Part-A have been applied to the tooling, electroplating is discontinued and deposition stops at step 485. The tooling assembly, including the metal coated SMP mandrel, is then removed from the bath at step 490, for separation in Stage 3 of the instant fabrication method.

Stage 3: Separation & Reuse

FIG. 5 illustrates Stage 3 of the present invention, starting at step 510. At step 515, the entire tooling assembly is heated until the temperature of the tooling exceeds the SMP transition temperature [Tt>Tg]. Heating continues (steps 520 and 525) until the SMP tooling becomes soft, at step 530.

Thus, at step 530, the tooling mandrel can be easily separated or removed, from the newly formed Part-A, without damage to either the mandrel or to Part-A. Thereafter, in some cases, a post-processing step 540 of the new duct may be required for surface conditioning or tolerance of Part-A.

At step 540, the fabricators have the option, if continuing a production run of Parts A is desired, of returning to Stage 1 (e.g., at step 320) and fabricating another identical Part-A. If continuing the production one is not desired at step 555, the newly formed Part-A can be stored or used, at step 560, in an engine fabrication or repair process.

In addition, fabricators have the option to reuse the tooling assembly for a different target part (steps 570, 575). If a need exists to make a different part (e.g., Part-B), fabricators can go to Stage 1 and reconfigure the tooling assembly to make a Part-B (e.g., by making appropriate adjustments at steps 315, 325 and/or 330).

Alternatively, at step 580, the tooling assembly can be cleaned and stored (step 585) for later reconfiguration.

Figure 6:
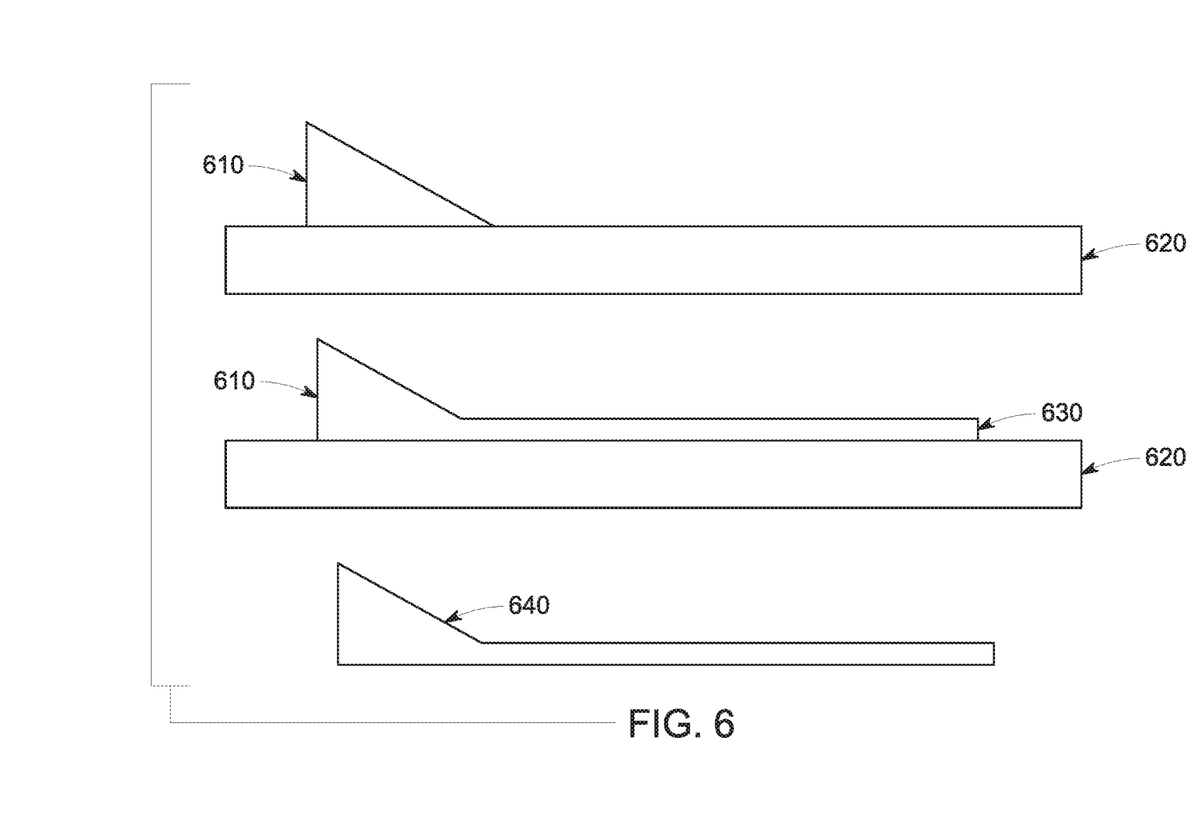
FIG. 6 illustrates steps of an exemplary high-level method of practicing an embodiment of the present invention.

FIG. 6 illustrates formation of flanges for attachment to the duct (Part-A) as part of the electroforming process, in accordance with the embodiments. Pre-machined flanges 610 can be attached the SMP mandrel 620 during the Stage 1, tooling design step 320. Flanges may also be attached to the SMP mandrel at the start of Stage 2 (see step 410).

The entire tooling, including the attached flange, can be put into the electroplating tank (e.g., step 420). Metal formation then proceeds by electroforming 630 over the external surface of the mandrel 620, as illustrated at step 460.

Thereafter in Stage 3 (step 530), the newly formed Part-A is separated from the tooling and the mandrel is removed. The metal coated flange, however, remains attached to Part-A. Thus, the flange can thereby become a subcomponent of the newly formed duct (Part-A) 640.

Non-Metal Aspects

Figure 7:
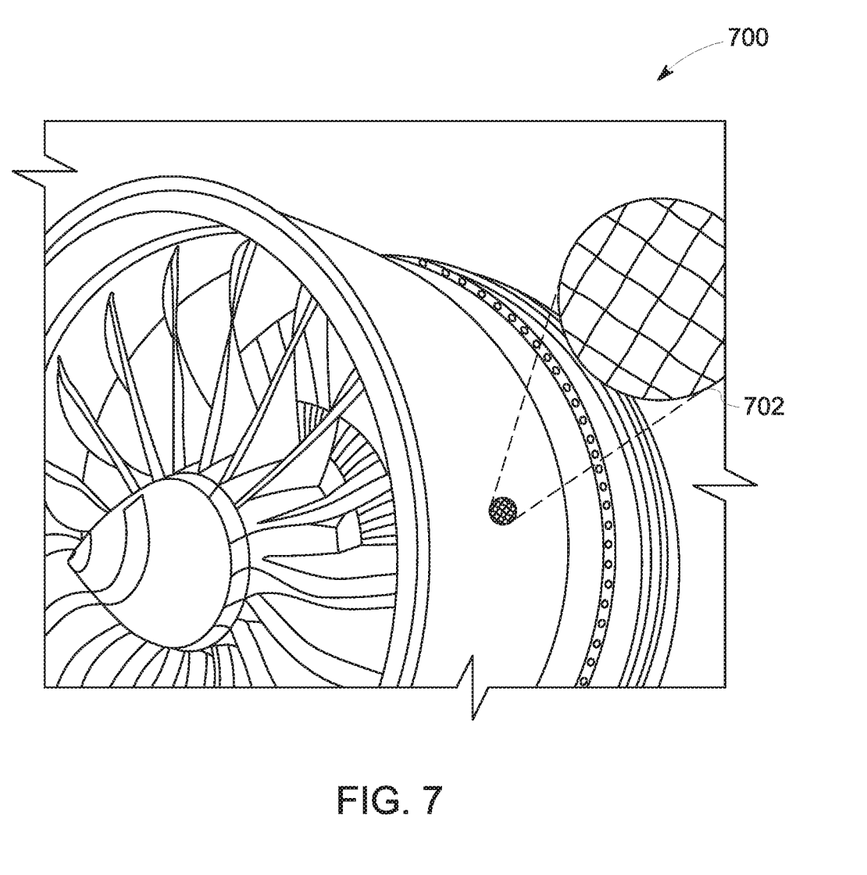
FIG. 7 depicts a section of an aircraft turbine engine with external parts to which the embodiments can apply.

With the continued development of high temperature resins for composite aerospace components, there has been an increased use of composites in turbine engine externals. These include carbon composite laminate mounting brackets, fan case housings, and supports. For example, see FIG. 7, depicting an aircraft engine turbine 700, with an external part 702.

Low temperature tubes and ducts are potentially another material replacement opportunity for components traditionally made from straight cylindrical stainless steel tubes. These tube typically are bent and formed with hydraulic mandrel tools and checked in gauge fixtures. The final formed tube is often a complex 3-D multiple-bend component. To produce a similar lightweight component out of carbon composites can require complex multiple degree of freedom robotic tooling for the combined mandrel positioning and material application. This will significantly increase both the initial manufacturing investment and processing time.

Complex tooling is often a key to production of both internal and external aircraft engine parts; but such increased complexity may require long lead times and is often expensive. For example, molds for a component part with only one 60 degree angle can have dramatically higher cost than that of a simple pipe or tube. Thus, workers in the aircraft liquid delivery tube art have recognized the need for other solutions for manufacturing complex geometry multi-bend multi-radii ducts.

For example, see Hammer '812, discussed above. regarding use of alternate duct fabrication materials. Hammer, however, contemplates use of 3-D printing technology with dissolvable mandrels. Also, Hammer expressly teaches away from use of smart memory materials (see Hammer '812 at page 2., Column 2, paragraphs 26, 28) as used in the embodiments.

Attempts to post bend straight woven carbon composite tubes have also been made. These have included local inductively heated and resistance heated die tests, which were not successful, and showed little potential for future success. On the other hand, an embodiment of the present invention uniquely solves this problem by forming the complex geometry tubes before a thermoset resin is applied to braided carbon fibers and cured. The instant unique conformable woven composite sleeve approach, used with smart tooling, is a simple solution to a challenging manufacturing process (that usually requires complex multiple degree of freedom robotic equipment and tooling).

An adaptation of the present invention, for composite ducts, utilizes conformable woven braided carbon fiber sleeves, along with high temperature thermoset resins (BMI, benzoxazine, phthalonitrile, or other). This adaptation also utilizes reusable SMP mold/tool to effectuate a simplified fabrication design solution for non-metal external parts of aircraft turbines, other turbines or engines, and other aerospace components.

Figure 8:
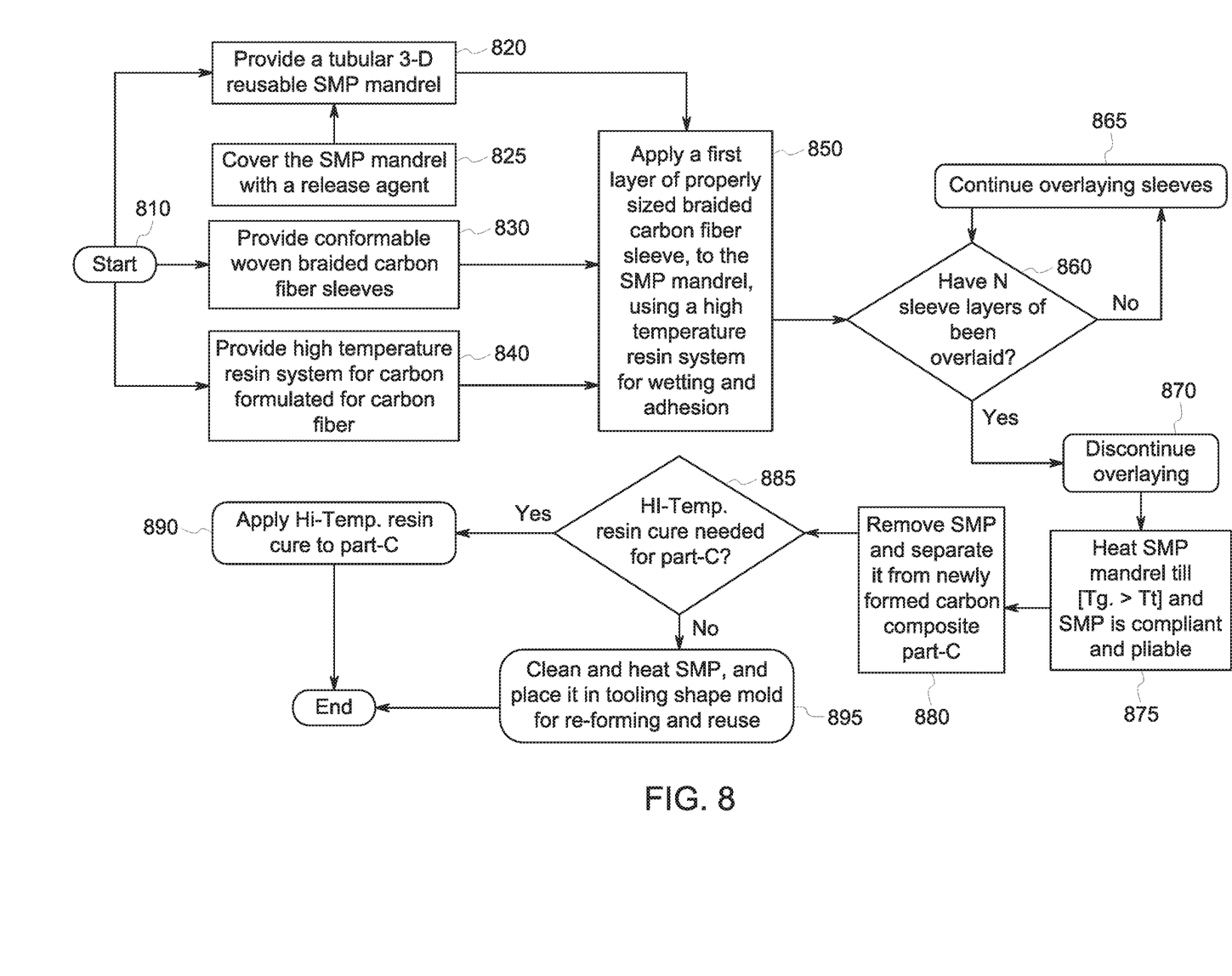
FIG. 8 is a flowchart of an exemplary method of an embodiment of the present invention for fabricating carbon composite external engine parts.

FIG. 8 is a flowchart 800 of an exemplary method of an embodiment of the present invention for fabricating carbon composite external engine parts.

Method step 810 shows the starting point for an embodiment of the present invention as used to fabricate non-metal parts for aircraft turbine engines. In ensuing steps, starting materials, used in the inventive process, are preliminarily selected or prepared using techniques known to those skilled in the art.

At step 820, a tubular 3-D reusable smart-polymer tooling mandrel is provided. Also at this stage, a tooling shape mold is provided, in a manner discussed earlier. At step 830, properly sized conformable woven braided carbon fiber sleeves are provided. At step 840, a high temperature resin system, formulated for carbon fibers, is provided.

At step 850, a first layer of properly sized braided carbon fiber sleeve, is applied to the SMP mandrel, using a high temperature resin system for wetting and adhesion. The number of subsequent layers (N) required may be determined, for example, based on the loads and boundary conditions for the target engine part (Part-C). Also, multiple local properly orientated braided sleeves may need to be applied to increase direction strength at high stress locations. Once it is determined that sufficient layers have been applied (steps 860 and 865) to the SMP mandrel, overlaying ceases at step 880.

The now carbon fiber coated SMP mandrel, which has been covered with a release agent (step 825), is heated at step 875 until the Tt exceeds the SMP Tg. Accordingly, the mandrel becomes compliant and pliable. At step 880, the elastic SMP can be easily removed and separated from the newly formed carbon composite Part-C.

Optionally, after removal of the SMP, if needed (step 885) for a particular type of target part, a subsequent higher temperature resin cure may be performed on Part-C, at step 890.

At step 895, the SMP plastic is cleaned, heated, and optionally placed in the tooling shape mold again, for re-forming and reuse. Thus ends the cycle for one embodiment of the inventive fabrication method.

CONCLUSION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The inventive method utilizes a reusable and reconfigurable tooling, which will be cheaper, more versatile and faster to change, than tooling used in relevant prior art metal part fabrication processes. Multiple sub-components can be integrated into a single one without increasing manufacturing complexity.

The preferred metal deposition embodiment is conducted at low temperature (<0.5 Tm of the metal). As a result, thermal deformation to the assembly is minimized, and thinner and lighter assembly is possible. Those skilled in the art would recognize that, with the inventive method, layerwise multi-material tubes and ducts can be enabled, which potentially provide novel mechanical & thermal properties. Moreover, surface texturing can be added to the interior surface of the metal ducts and tubes for thermal transfer and pressure drop considerations.

The preferred carbon composite lay-up embodiment reduces production tooling labor and material costs, for complex geometry parts. The embodiments of the present invention obviate the need to bend, form and join tubes and ducts with costly complicated tools such as hydraulic mandrels. The unique conformable woven composite sleeve approach, described herein, with smart tooling is a simple solution to a challenging manufacturing process that often requires complex multiple degree of freedom robotic equipment and tooling. These complex robotic systems have high initial equipment and programming development costs.

The embodiments thus use a totally new method than the current manufacturing methods for tube and duct. Low temperature techniques are used for layering material onto reusable SMP tooling, rather than high temperature forming, joining processes. In some instances, hot deposition metal forming processes or 3-D metal printing (Direct Metal Laser Melting) are used to produce similar parts. In other instances, wet lay-up of woven or spun carbon fiber on expendable 3-D mandrels can be used. For the reasons indicated herein, however, it is believed the low temperature deposition fabrication method provides more economical and technical advantages than those other methods.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method for fabricating a metal target part using a reconfigurable shape memory polymer (SMP) and metal deposition, the method comprising:
    providing a SMP material in a rigid pre-form state (rigid SMP material), having a known glass transition temperature (Tg); and a tooling assembly with a shape mold having a geometry representative of a target part;
    triggering a state change in the rigid SMP material to form a tooling mandrel by (i) placing the rigid SMP material in contact with the shape mold, (ii) applying a stimuli to the tooling assembly to raise a temperature of the rigid SMP material above Tg, until the rigid SMP material becomes an elastic malleable substance to replicate the geometry of the shape mold to form the tooling mandrel, (iii) cooling the shape mold until the tooling mandrel becomes rigid and having a locked-in geometry, and (iv) removing the cooled tooling mandrel from the shape mold;
    coating the outer surface of the tooling mandrel with a conductive material;
    placing the coated conductive tooling mandrel into an electroplating tank;
    applying a voltage to electrochemically deposit one or more layers of metal onto the conductive outer surface of the tooling mandrel, to form the metal target part coating the tooling mandrel, and removing the tooling mandrel coated with the metal target part from the tank;
    heating the tooling mandrel to a temperature that exceeds Tg until the tooling mandrel becomes soft and pliable;
    separating the tooling mandrel from the metal target part,
    cooling the separated tooling mandrel to allow it to return to the locked-in geometry to be reused.

2. The method of claim 1, wherein the metal target part is for immediate use as a tube or duct for fluid delivery in an aircraft engine.

3. The method of claim 1, further comprising applying post-proces sing for surface conditioning or tolerance of the metal target part for use as an external aircraft engine part.

4. The method of claim 1, wherein the stimuli comprises at least one of thermal stimuli, pressurization, and use of heated air, gas, or other fluids.

5. The method of claim 1, after separation from the metal target part, further comprising cleaning, reheating, and placing the tooling mandrel for re-forming and reuse.

6. The method of claim 1, after separation from the metal target part, further comprising reuse the tooling mandrel to make another metal part.

7. The method of claim 1, wherein the conductive material is coated onto the tooling mandrel using at least one of painting, spraying, dip coating, and sputtering.

8. The method of claim 1, wherein the applying voltage step further includes continuing electroplating layers of metal onto the tooling mandrel, until the N layers, required for the metal target part to be used as an external aircraft engine part, have been overlaid, and deposition is completed.

9. The method of claim 1, further comprising forming multiple (N) layers in the metal target part, wherein a first layer (N=1) of metallic material is deposited by electroplating, and subsequent layers (N=>2) are deposited by alternative methods including at least one of cold spraying or ultrasonic consolidation.

10. The method of claim 1, wherein different metallic materials are used for different layers in the metal target part.

11. The method of claim 10, wherein one layer is composed of copper alloy and another layer is composed of nickel alloy.

12. The method of claim 1, wherein, during the tooling mandrel separation from the metal target part step, the tooling mandrel is heated to become sufficiently malleable to allow the newly formed metal target part to be taken apart from or separated from the tooling mandrel without loss of its geometric accuracy where said newly formed metal target part has a complex geometry in 3D space including multiple bends and variable cross sections.

13. The method of claim 1, wherein the metal has a melting temperature and the applying the voltage step includes maintaining the electroplating temperature less than half of the metal melting temperature.

14. The method of claim 1, wherein said metal target part is a part of an aerospace system.

15. The method of claim 1, wherein said metal target part is an external aircraft engine part.

16. The method of claim 1, wherein said metal target part is a part of a turbine.

17. The method of claim 1, wherein said metal target part include complex cylindrical and non-cylindrical tube geometries with non-uniform cross-sectional size including tapering.

18. The method of claim 1, wherein said metal target part geometry includes complex transitions from cylindrical to rectangular cross-sectional shapes.

* * * * *